No. 892,357. PATENTED JUNE 30, 1908.
E. L. BRILLHART.
BUG EXTERMINATING MACHINE.
APPLICATION FILED APR. 9, 1904.
4 SHEETS—SHEET 1.
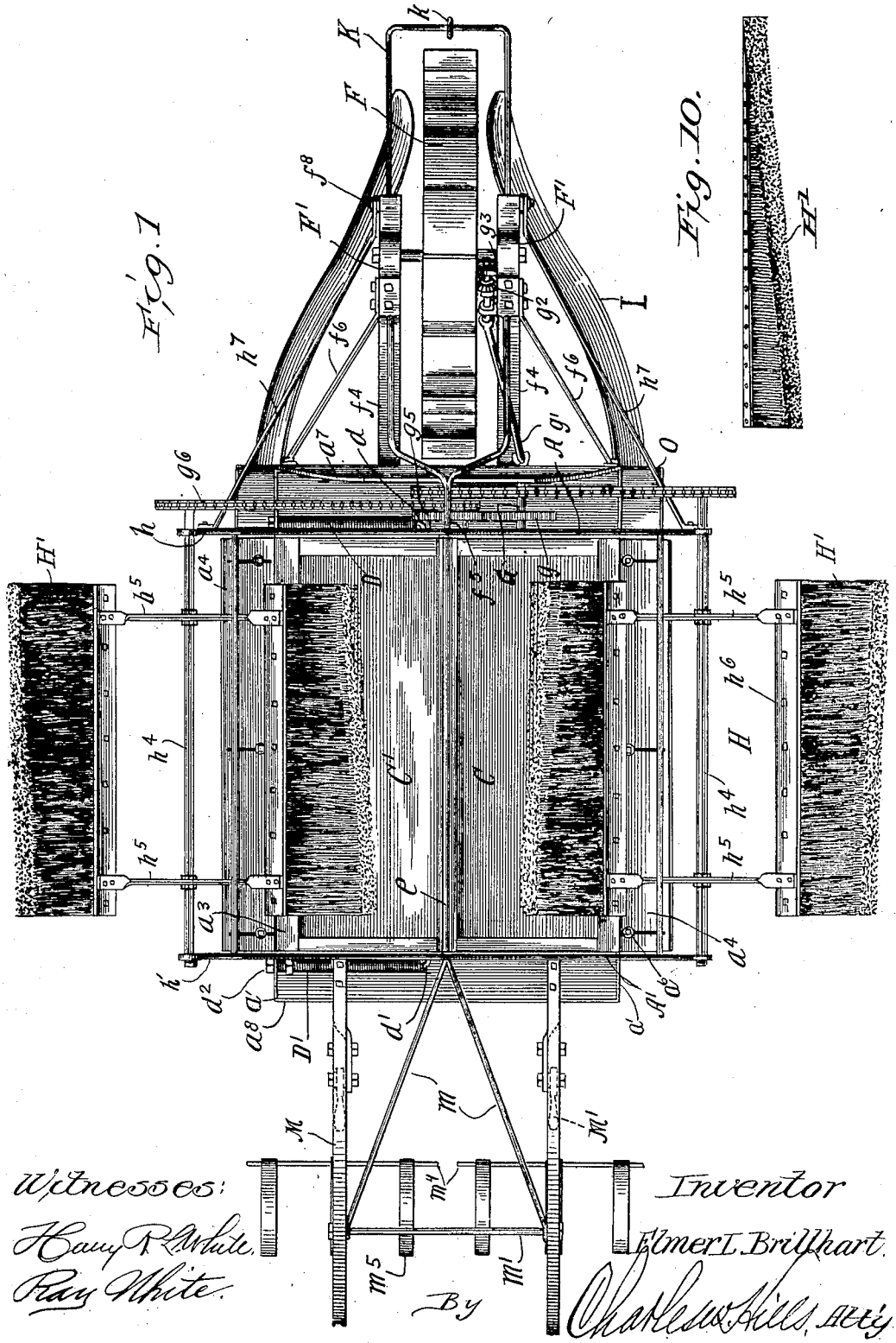

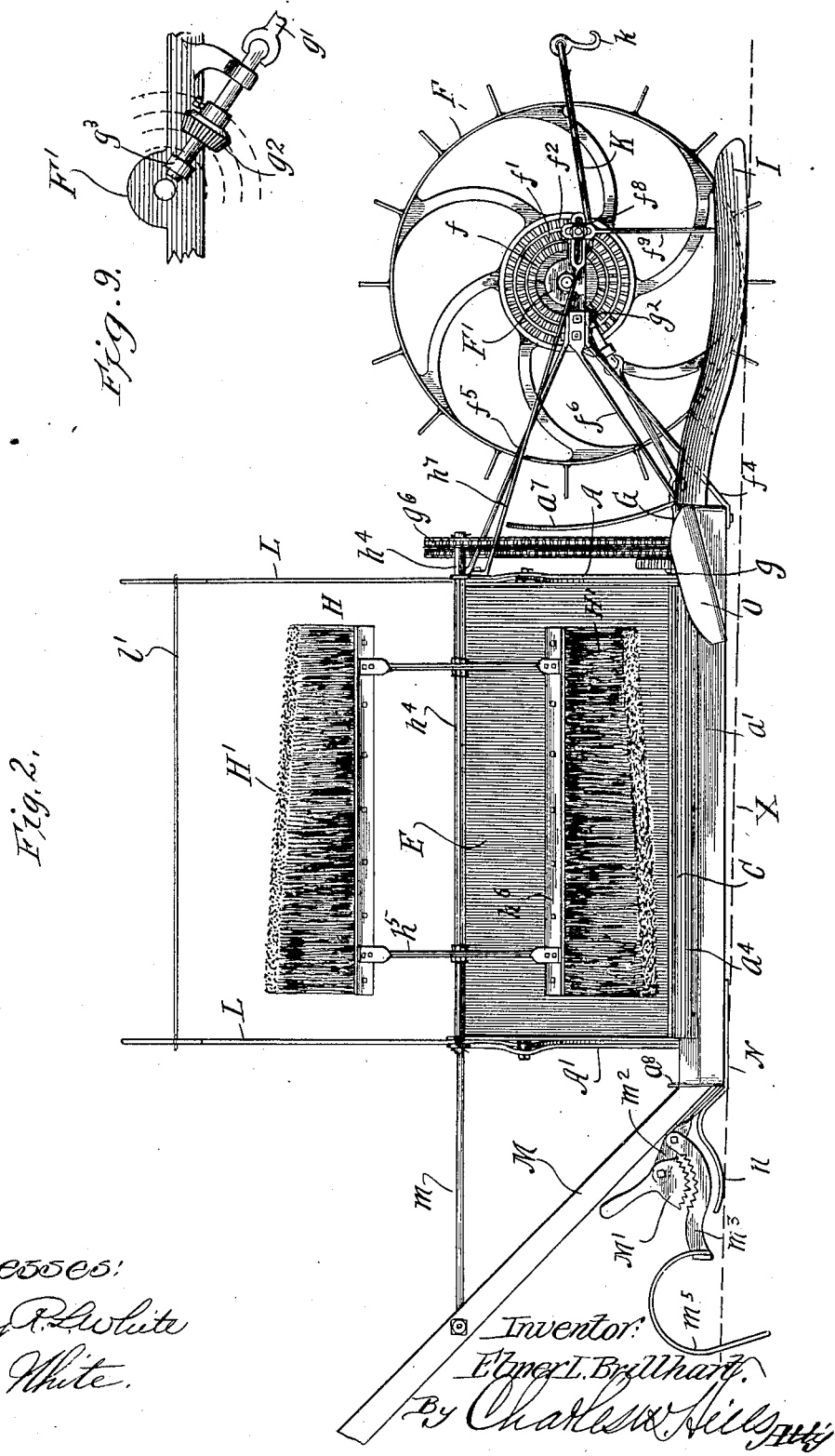

No. 892,357. PATENTED JUNE 30, 1908.
E. L. BRILLHART.
BUG EXTERMINATING MACHINE.
APPLICATION FILED APR. 9, 1904.
4 SHEETS—SHEET 3.
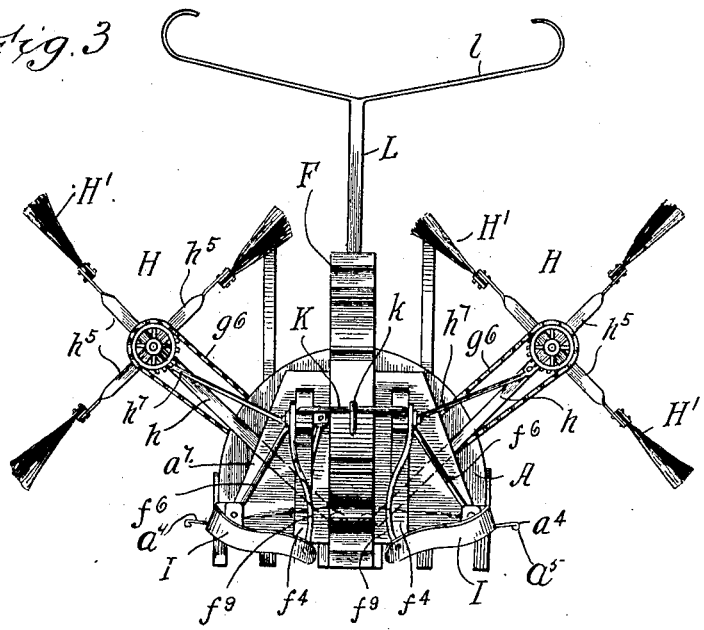
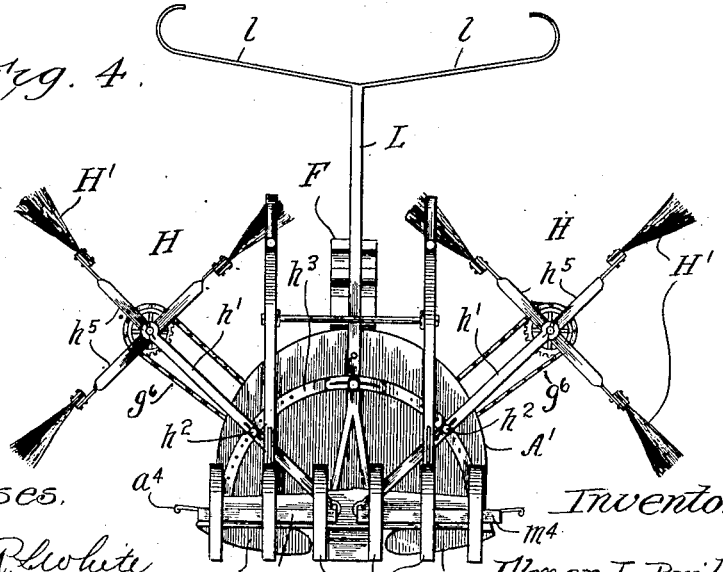

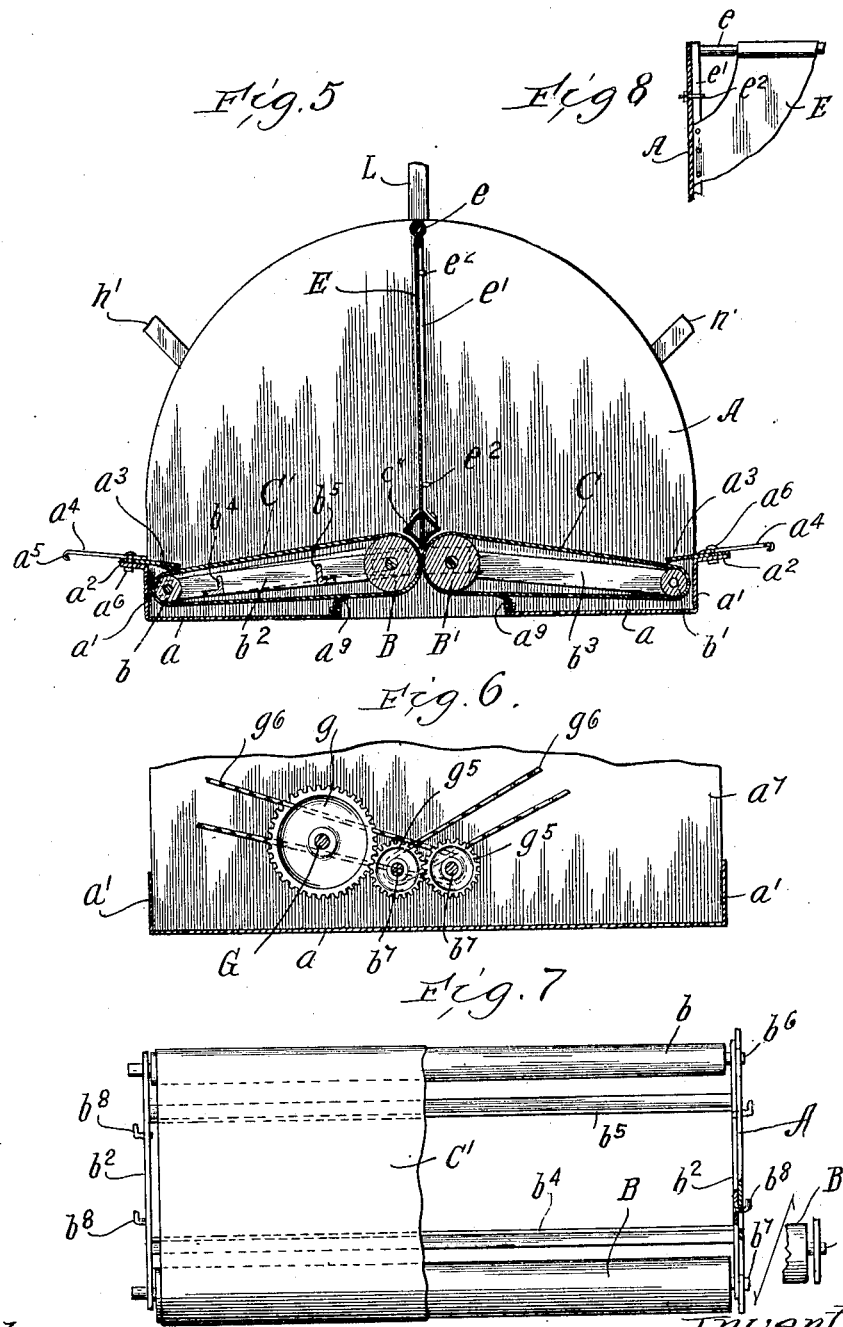

UNITED STATES PATENT OFFICE.

ELMER L. BRILLHART, OF PENTWATER, MICHIGAN, ASSIGNOR TO BRILLHART-CARTIER COMPANY, OF LUDINGTON, MICHIGAN, A CORPORATION OF MICHIGAN.

BUG-EXTERMINATING MACHINE.

No. 892,357.      Specification of Letters Patent.      Patented June 30, 1908.

Application filed April 9, 1904. Serial No. 202,314.

*To all whom it may concern:*

Be it known that I, ELMER L. BRILLHART, a citizen of the United States, and a resident of Pentwater, county of Oceana, and State of Michigan, have invented certain new and useful Improvements in Bug-Exterminating Machines; and I do hereby declare that the following is a full, clear, and exact description of the same, reference being had to the accompanying drawings, and to the letters of reference marked thereon, which form a part of this specification.

This invention relates to improvements in bug exterminating machines and more particularly to a machine adapted to collect and destroy the bugs from potato plants and other comparatively low growing plants and vines.

The invention is an improvement over my prior invention set forth in U. S. Letters Patent issued May 2nd, 1899, and numbered 623,977.

In the devices heretofore constructed, while it has sometimes been possible to collect and destroy the bugs from the larger vines it has been thought impracticable to collect bugs from the young vines, say those but a few inches in height, effectively, and though the constructions heretofore devised, including my own prior invention, were capable of collecting the bugs from the larger vines, the greatest injury is usually done to the vines when small and shortly after appearing above the ground.

It is the object of this invention to provide a construction cheap, simple and easily operated, adapted to operate close to the ground and to collect and destroy the bugs not only from the larger vines but also from vines shortly after they have broken through the ground.

It is also an object of my invention to provide in connection with said device means for simultaneously cultivating and stirring the soil while collecting the bugs. This is of importance inasmuch as any of the slugs knocked from the vine and covered in hot weather are usually killed by the heat of the ground. The stirring of the soil by the cultivator enables the user to perform two operations instead of one, namely, the cultivation of his crop as well as the removal and destruction of the bugs therefrom.

The invention embraces many novel features and consists in the matters hereinafter described and more fully pointed out and defined in the appended claims.

In the drawings: Figure 1 is a top plan view of a device embodying my invention with the handles broken away. Fig. 2 is a side elevation thereof. Fig. 3 is a front end elevation of the same. Fig. 4 is a rear end elevation thereof. Fig. 5 is a central transverse section looking toward the rear of the machine and with the reels omitted. Fig. 6 is an enlarged fragmentary transverse section taken at the rear of the driving chains. Fig. 7 is a detail of one of the conveyer belts. Fig. 8 is a fragmentary detail illustrating the means for securing the central curtain in place. Fig. 9 is an enlarged detail of the driving mechanism. Fig. 10 is a plan view of one of the brushes.

As shown in said drawings:—Said machine comprises a frame of sheet metal comprising the vertical transverse end members A and A' which are connected on the bottom at each side thereof with the relatively heavy plates $a$ each of which is bent upwardly to afford engagement with the sides or lateral edges of the end members A—A' as shown in Fig. 5, and indicated by $a'$ and the upper margin $a^2$ of which is flanged outwardly to support the laterally adjustable gathering plates $a^3$—$a^4$ which as shown comprise two metallic plates, one of which, $a^3$ projects inwardly between the end members A—A' and the outer member $a^4$ of which is provided with an outer downcurved edge $a^5$ and transverse slots as shown in Fig. 1 to receive the bolts $a^6$ whereby said plates are laterally adjustable to the varying widths of rows. Bottom and side plates extend forwardly and rearwardly as shown in Figs. 1 and 2 and are provided at their ends with upturned transverse flanges $a^7$—$a^8$ of which the flange $a^7$ extends upwardly for approximately the entire height of the end frame plate A and as shown is curved slightly rearwardly and affords protection for the mechanism contained between the same and said end frame plate A. The bottom plates $a$, the side flanges $a'$ and flanges $a^2$, as well as the forwardly projecting extensions thereof, and the upwardly directed end flanges $a^7$—$a^8$ are formed from a single sheet of metal bent to the desired shape and provided with a central longitudinal slot between the end frame plates A—A' as shown in Figs. 5 and 6, though obviously the same may be constructed in any desired manner from separate plates, angle bars and other forms of structural metal, or if preferred wood or other material may be utilized to afford the frame or parts thereof. Journaled in said end frame members A—A' and in close proximity with each other on each side of the central line are rollers B—B' which are normally parallel with corresponding rollers $b$—$b'$ of smaller size which are journaled in close proximity with the bottom plate $a$ and side flanges $a'$ as shown in Fig. 5 and below the inwardly directed extension plates $a^3$.

An endless belt carrier of rubber or other suitable material C—C' is trained over each pair of rollers B—$b$ and B'—$b'$ as shown in Fig. 5 and which owing to the rollers B—B' being journaled in close proximity with each other bear positively against each other for the entire length of said rolls. Suitable bearings are provided on each of the end plates for said rollers. As shown straps of sheet metal $b^2$—$b^2$ are rigidly connected by angle bars $b^4$—$b^5$ and the outer and inner ends of said straps are apertured to afford a journal bearing for the gudgeons $b^6$ and $b^7$ on the ends of the roller $b$ and B respectively. Said end frame members $b^2$ for the roll are provided on the outer side thereof with outwardly directed hooked projections $b^8$ adapted to extend through slots in the end frame plates A—A' which are also slotted transversely to receive the gudgeons $b^6$—$b^7$ of the rolls thus permitting the rolls B—$b$ with the frame therefor to be shifted laterally toward or from the center. Means are provided for holding said frame with the rolls therein at the inward limit of their adjustment comprising strong pushing springs D—D' which as shown are spiral springs through each of which extends a central rod, the inner ends of which $d$—$d'$ project through the end plate member and engages the end of the frame for the rolls or forms an extension of one of the hooks $b^8$. The outer ends of said rods extend through the side flanges $a'$ and are provided each with an adjusting nut $d^2$. Said springs act to force said frame with its rolls inwardly into position for the conveyer belt C' thereon to bear for its entire length against the corresponding belt C trained over the other pair of rollers.

The rolls B'—$b'$ are provided with end gudgeons in the same manner as before described journaled in suitable bearings in the straps $b^3$ riveted or otherwise secured to the end frame plates A—A' and inasmuch as the belt carrier C with its rolls is non-adjustable laterally, and the belt carrier C' with its rolls is carried in a laterally adjustable frame, it follows that a hard object carried by the conveyers between the rolls B—B' acts to force said rolls B—$b$ laterally to immediately return to the position shown in Fig. 5, after the passage of the object between the same. Beneath said carriers and rigidly secured to the inner margins of the bottom plate $a$ are the scraper blades $a^9$ which extend for the entire length of the frame and are each provided with an upwardly and inwardly directed edge which bears against the under side of the belt conveyer and act to scrape any adherent material therefrom permitting the same to fall through the opening between said plates upon the ground. Conveniently the inner edges of the bottom plates $a$ may be flanged upwardly as shown in Fig. 5 and the scraper blades are made of sheet steel, bent to engage therewith and apertured to correspond with apertures in said flange and are detachably secured thereto by means of bolts.

Rigidly secured between the end frame plates is the vertical longitudinal partition or curtain E of canvas or other suitable material. The top of said curtain is engaged for its entire length upon a central longitudinal rod or bar $e$ which extends through and rigidly connects the top of said end frame plates. The ends of said curtain are secured to the end frame plates A—A' by means of bars or straps $e'$ of metal whereon the margins thereof are engaged and which are removably secured upon the end frame plate by means of the eye bolts $e^2$ or in any desired manner. At the lower end, said bars $e'$ are flanged outwardly to afford a yoke to which is rigidly secured by riveting or like means a sheet metal deflector $c^4$ approximately rectangular in shape and of a length sufficient to fit between the end frame plates and which is secured in position on said rods $e'$ with one of the angles or corners thereof extending downwardly between the rolls as shown in Fig. 5 and the lateral angles extending sufficiently above the carrier to permit nothing larger than a bug to pass between the rolls. Means are provided for driving said carriers and other operating mechanism comprising, as shown, a traction wheel F of any desired or suitable kind and provided on its periphery with projections adapted to prevent slipping. At its center, as shown, said wheel is provided with a plurality of concentrically arranged lines of gear teeth adapted to afford means for varying the speed of the drive. As shown three of such concentric lines of gear teeth are shown and indicated by $f$—$f'$—$f^2$ respectively. Said traction wheel is journaled in suitable bearings of which the boxes F' therefor are rigidly secured at their rear ends on the forwardly and upwardly directed ends of the bars $f^4$, the rear or inner ends of which are bolted or otherwise secured beneath the front ends of the frame. A forwardly directed rod $f^5$ is secured at its rear end near the top of said end frame plate A and if preferred may be a continuation of the rod $e$ and at its forward end is flanged to afford a yoke, one arm of which extends on each side of the traction wheel F and is bolted at its forward end to the rear ends of said boxes F' as shown in Figs. 1 and 2. In the same manner rods $f^6$ are rigidly secured near the outer side of the end frame member near the bottom thereof and extend upwardly and are bolted to the rear end of the box thus rigidly supporting said bearings at the front end of the machine.

Journaled in suitable bearings in the end frame plate A and the deflector flange $a^7$ is a shaft G having secured thereto the gear wheel $g$. The forward end of said shaft projects through the deflector $a^7$ and is connected with a driving shaft $g'$ by means affording a universal joint. The forward end of said driving shaft $g'$ extends upwardly and forwardly and at its front end is journaled in a bearing $g^3$ supported on the bearing box F'. A conical pinion $g^2$ is slidably and adjustably engaged thereon and adapted to be secured in position to mesh with either of the concentric lines of gears $f-f'$ or $f^2$, thereby adapting the gear wheel $g$ to be driven at any of three rates of speed dependent upon the inward or outward adjustment of said pinion. On each of said gudgeons $b^7$ on the front ends of the rolls B—B' and which project through the end frame or plate A are secured intermeshing gear wheels $g^5$ of equal size, one of which intermeshes with the gear $g$ so that the rotation of said gear $g$ acts to rotate the gears $g^5$ and the belt conveyers in opposite directions and inwardly. Also secured on said gudgeons are sprocket wheels over each of which is trained a sprocket chain $g^6$ which serves to transmit power to drive the reels H, one of which is provided on each side of said frame. Said reels H are adjustably supported in position to brush the tops of the vines against the extension plate $a^4$ and inwardly and rearwardly and as shown are journaled on the upper ends of adjustable bars $h-h'$ pivoted at their lower end centrally near the bottom of each of the end frame members. Said bars project upwardly and outwardly and are each provided intermediate their ends with a relatively short longitudinal slot as shown in Fig. 4, adapted to receive a bolt $h^2$ which engages in an apertured segment $h^3$ secured on the outer side of each of said end frame plates and which affords means for swinging said bars $h-h'$ upwardly or downwardly as desired to vary the elevation of the reels. Said reels each comprise a central shaft $h^4$ journaled at the outer ends of the bars $h-h'$ and provided at their forward ends with sprocket wheels as shown in Fig. 3 over which are trained the sprocket chains $g^6$ before described. As shown each of said reels is driven from the sprocket wheel on the opposite side of the center of the machine therefrom, as indicated in Fig. 6. Rigidly connected on said central shaft $h^4$ are the arms $h^5$ arranged at a right angle with each other and at the outer ends of which are rigidly secured by bolting or other suitable means the brushes H'. Said brushes in the construction shown are constructed of broom straw or other suitable material rigidly secured by riveting, bolting or in any desired manner in a metallic back $h^6$ and arranged so that the outer end of the brushes are slightly twisted in spiral form so that as the same revolves, they act to brush the tops of the vine inwardly and rearwardly, thus overcoming the forward drag of the machine on the vines.

Rigidly bolted near the upper ends of the bars $h$ are the forwardly directed brace rods $h^7$ which extend inwardly and forwardly and are slotted at their forward ends to adjustably engage by means of the bolt $f^8$ the front end of the bearing or box F'. Also engaged on each end of the bolt $f^8$ is the depending rod $f^9$ the upper ends of which are slotted longitudinally to engage said bolt and the lower ends of which are engaged at the forward end of the upwardly inclined guides I which engage beneath the tops of the vines should the same be bent between the rows and lift and carry the same upwardly to permit the tops to be struck by the reels. Said guides are bolted at their rear ends on the deflector plate $a^7$ and to the end of the frame in a manner to permit said front ends of the same to be elevated by means of the rods $f^9$.

Means are shown for attaching one or more draft animals to said machine comprising a rod K bent to afford a U shaped loop which extends beyond the wheel and the ends of which are rigidly bolted or otherwise secured to the boxes F' and which is provided centrally with a hook $k$ or other desired means to permit attachment with a swingletree or the like. At the front and rear end of the machine and secured on said end frame plates A and A' are the upwardly extending rods L which are yoked at the upper end to provide laterally directed, upwardly inclined arms $l$, which afford a support for the harness lines above the reel, and are connected by longitudinal rods $l'$ which aid in stiffening the frame.

Rigidly secured at the rear end of the frame and extending rearwardly and upwardly therefrom are the operating handles M which are connected with the upper end of the end frame plate A' by means of the brace rods $m$ and are also connected with each other by means of the transverse rod $m'$. Rigidly bolted on the under side of each of said handles and to the rear end of the frame is a rearwardly extending bar $m^2$ upon which is pivotally engaged a rearwardly extending lever $m^3$ provided at its outer end with a transverse bar $m^4$ having a length approximately equal to half the width of the machine and upon which are rigidly secured spring cultivator teeth $m^5$ which act to partly support the rear end of the frame and to stir the ground. Said teeth as shown three in number are provided on each bar and equally spaced thereon and means are provided for adjusting the depth of the operation of the said teeth comprising a cam lever M' provided with a notched or toothed under surface adapted to engage a complementally notched surface on the lever $m^3$ and acting to hold said cultivator teeth in operative relation.

At the rear end of the machine and extending beneath each of the corners thereof is provided a shoe N riveted or bolted thereon and which may be a casting or as shown in the drawings, a relatively thick plate of metal provided with a rearwardly directed extension $n$ which serves to partly support the rear end of the machine and to prevent wearing of the bottom plates $a$ by contact with the ground.

The operation is as follows: As clearly shown in Fig. 2 in which the ground line is represented by X, the machine in operation, drawn by any suitable draft animals, slides upon the bottom plate or shoes between the rows of potatoes or other vines to be operated upon. The traction wheel F communicates power to the conveyers and reels. The extension plates $a^4$ are capable of adjustment laterally to a sufficient extent to enable the machine to be used for any usual or ordinary distance desired between rows and the rounded edges of said extension plate are brought into close proximity with the bottoms of the vines, even though the same have been but a few days above the surface of the ground. As the machine moves forwardly the reels, the brushes of which as before stated are spirally bent, strike an inward and rearward blow upon the vine sufficient to knock the potato bugs, slugs or other insects therefrom upon the conveyers which carries them inwardly and crushes them between the rolls B and B'. The crushed bugs fall from between the rolls through the open bottom and upon the ground and any adherent material is scraped from the conveyer belt by the blades $a^9$ as before described. Should a pebble or other small object fall upon the conveyer the rolls B—$b$ and frame therefor are moved laterally against the tension of the springs D—D' which force the rolls back into operative position after the object has passed through. Should the vines be larger the reels may be adjusted at a greater elevation and should a portion of the tops of the vines be inclined inwardly between the rows the guides I engage beneath the same and lift the same upwardly and inwardly until the same rest above the extension plate $a^4$ in position for the brushes of the reels to contact therewith as before described.

During the entire operation of the machine the cultivator at the rear end of the machine is operated at a desired depth to thoroughly stir the soil and exerts a rearward drag and acts also to cover the slugs or beetles which may have fallen between the rows during the passage of the machine. The depth of the cut of said teeth is accurately adjusted by means of the cam lever M'. Should the draft animal be a rapid walker and tend to drive the reels too rapidly the conical pinion $q^2$ may be adjusted to engage the innermost line of gear teeth $f$ on the traction wheel, while with a slower walking draft animal the pinion should be adjusted to engage the gear teeth $f'$ or $f^2$ as preferred.

As a further improvement I have provided means for slightly depressing the soil in advance of the extension plates to prevent any dirt or the like finding its way upon the carriers and for this purpose I have provided a deflector O comprising a sheet of metal bent to a desired shape and rigidly secured on each side of the frame below the extension plates and the rear end of which is directed downwardly beneath the same as shown in Fig. 2.

Obviously inasmuch as the frame runs flat upon the ground between the rows and the reels are adjustable to enable the same to operate in close proximity with the extension plates $a^4$ the machine is adapted for use shortly after the vines have appeared above the ground and owing to its adjustment is capable of use during any period of growth thereof, thus enabling the user to simultaneously perform two operations for the benefit of his crop. Furthermore, owing to the cheap, simple and durable construction of the machine and its light weight, the same can be operated with the expenditure of but slightly more power than is necessary in ordinary cultivators.

Though I have described my machine as applicable for use in cultivating potato fields and removing and destroying the bugs from the vines, it is obvious that the machine is useful wherever it is necessary or desirable to remove insect pests from growing crops planted in rows and that the same may be utilized for many purposes other than herein described, and furthermore though the machine has been described as composed mostly of sheet and structural metal it is obvious that other materials may be used and many details of construction may be varied without departing from the principles of this invention.

I claim as my invention:

1. In a machine of the class described, a frame adapted to move along the ground, conveyers arranged slightly above the bottom of the frame, one of which is spring pressed against the other and inwardly and rearwardly operating beaters acting on adjacent plants as the machine advances.

2. A bug machine comprising a low frame adapted to be drawn along the ground, a lateral extension on each side thereof adapted for adjustment to suit the width of rows of plants, means for directing the plants on to said extensions, beaters on each side the frame acting to knock the tops of the plants inwardly and rearwardly, thereby knocking the bugs into the frame and means for destroying said bugs.

3. A bug machine comprising a frame adapted to be drawn on the ground between plant rows, means for directing the plants on said frame, a driving wheel, a revoluble spiral beater driven thereby and acting to knock the tops inwardly and rearwardly, knocking the bugs from the tops upon the frame and means also operated by said wheel adapted to kill the bugs.

4. A bug exterminator comprising a flat frame adapted to be drawn upon the ground, stirring means at the rear end thereof adapted to partially support the frame and to cover the insects not destroyed by said machine, a driving wheel at the front end, extensible inwardly inclined adjustable ledges on the sides of the machine, a revolving brush on each side of the machines and driven from said wheel, each comprising a plurality of spirally curved sides adapted to strike the tops of the plants inwardly and rearwardly, means for raising the plant to a vertical position and crushing means driven from said wheel and acting to kill the bugs.

5. In a machine of the class described, a low frame adapted to be drawn flat upon the ground between adjacent plant rows, an inwardly operating apron on each side the machine adapted to deliver their load centrally of the frame and coacting to crush the same, means for moving one apron laterally of the frame, spiral brushes acting on each side the frame to knock the plant tops inwardly and rearwardly as the machine advances, a driving wheel adapted to drive the brushes and aprons, and a scraper arranged below the aprons.

6. In a machine of the class described, spiral revoluble brushes carried on each side thereof and acting when revolved to strike the tops rearwardly and inwardly, means adjusting said brushes as to height, a variable speed driving means therefor, a laterally projecting adjustable ledge at each side the machine slightly above the ground and means for directing the tops on said ledges.

7. A machine of the class described comprising a collection surface, a laterally projecting adjustable ledge on each side thereof, a forwardly and inwardly directed guide for each ledge and a revolving reel on each side the machine comprising a plurality of spirally curved brushes each acting to strike the tops of the plants inwardly and rearwardly.

8. A machine of the class described comprising a sheet metal frame inwardly operating aprons thereon contacting along the middle of the machine, a yielding support for one of said aprons acting to force it against the other with force sufficient to crush bugs between the same, a scraper for each apron, means for preventing stones or the like larger than the bugs from passing between the aprons and brushes acting along each side the machine to knock the bugs into the machine.

9. In a bug machine the combination with inwardly traveling aprons of crushing rolls between which said aprons deliver their load, resilient means holding one of said rolls in operative relation with the other, a deflector above and between the rolls arranged to prevent bodies larger than the bugs from passing between the rolls and a scraper positioned to clean the rolls.

10. In a device of the class described the combination with a low frame provided with lateral extensions of aprons therein adapted to travel inwardly, automatic means for moving one of said aprons laterally with respect to the other, guides adjacent said lateral extensions, spirally curved brushes journaled above the frame, means for operating said brushes and a deflector intermediate said aprons.

11. In a machine of the class described a supporting frame, adjustable ledges thereon, a plurality of rotative aprons in said frame, a movable carrying frame for one of said aprons, means thereon adapted to normally hold said aprons in close relation, a plurality of brushes journaled above said apron and means for operating the same.

12. In a bug exterminating machine, a supporting frame, ledges thereon adapted to be adjusted to the width of rows of plants, guides projecting forwardly and inwardly from said ledges, inwardly moving aprons in said supporting frame, a frame carrying one of said aprons and slidably engaged in the supporting frame, springs thereon adapted to hold said aprons in close relation, a plurality of rotative brushes above said apron and means for operating said brushes and aprons.

13. In a machine of the class described the combination with a frame of means adapted to partially support the rear end thereof and to cover the insects not killed by said machine, a drive wheel at the forward end of said frame, an adjustable ledge on each side of said frame, a guide extending from each forwardly and inwardly, conveyers on said frame one of which is movable to and from the other and rotative brushes adapted to brush the plants inwardly and rearwardly of the machine.

14. In a machine of the class described the combination with a frame adapted to be drawn between rows of plants of a plurality of teeth adapted to partly support the rear end thereof and acting to destroy the insects unharmed by said machine, a drive wheel adapted to support the forward end, laterally adjustable ledges on said frame, a curved guide on each adapted to direct the plants thereon, a plurality of conveyers on said frame one of which is movable laterally of the frame, a plurality of rotative brushes adapted to sweep the vines inwardly and rearwardly against the sides of the frame and means for driving said conveyers and brushes.

15. In a bug exterminator a low frame, an extensible ledge on each side thereof adapted to engage rows of plants, a curved guide extending forwardly from each ledge adapted to direct plants thereon, inwardly moving conveyers on said frame, a plurality of brushes journaled on the frame and adapted to knock the plants inwardly and rearwardly thereof and means for driving the conveyers and brushes.

16. In a bug exterminator the combination with a low centrally slotted frame means for adjusting the rear end thereof as to height rotative conveyers on said frame adapted to contact above said slot, means yieldingly supporting one of said conveyers, an upwardly and inwardly directed scraper adjacent each margin of the slot adapted to contact with said conveyers, a drive wheel, means driven thereby acting to operate said conveyers, an adjustable reel on each side of the frame and means for elevating plants into engagement with said reel.

17. In a bug exterminator the combination with a frame of rotative conveyers thereon adapted to contact at their adjacent sides, a scraper carried on the frame beneath each conveyer, means for adjusting the frame as to height, a drive wheel, a plurality of gears thereon and arranged concentrically therewith, a drive shaft journaled in the forward end of the frame, a shaft connected therewith and journaled in the bearing for said wheel, a pinion adjustably engaged thereon, a plurality of spiral brushes rotatively secured on each side of the frame, means for rotating said brushes, a central vertical partition secured to said frame, means for lifting a covered or bent plant and directing the same along the side of the conveyers and means for packing the ground in advance of the brushes to prevent the dirt from being thrown upon the conveyers.

18. In a machine of the class described the combination with a frame of an extensible ledge on each side thereof adapted to engage a row of plants, inwardly moving conveyers on said frame, a plurality of brushes journaled on the frame and adapted to knock insects from the plants inwardly on said conveyers, means beneath the frame adapted to level the ground and a plurality of teeth engaged at the rear of the frame and adapted to cover the insects not killed by said conveyers.

19. In a device of the class described the combination with the frame of adjustable sides thereon, inwardly movable conveyers adjustable relatively of each other, guides for directing plants against said adjustable sides, brushes rotatably engaged to said frame adapted to brush said plants when passing the adjustable sides and means for packing the ground in advance of said brushes.

20. In a device of the class described the combination with a frame of removable sides therefor, guides adapted to direct plants along same, means for brushing said plants on said sides, means for conveying insects from said sides and killing the same, means for preventing the soil from being brushed upon said conveyers and means adapted to simultaneously actuate said brushing means and conveyers.

21. In a device of the class described the combination with a frame provided with a slot centrally thereof, an adjustable plate engaged to each side of the same, adjustable spiral brushes adapted to brush insects onto said plates, conveyers adapted to carry the insects from said plates and crush and drop the same through said slot, means preventing soil from being thrown upon said sides and conveyers and means adapted to differentially drive said brushes and conveyers.

22. In an insect destroying device the combination with a frame of sides therefor, an inwardly moving conveyer adjacent each side, means directing the plants along said sides, brushes adapted to brush the insects onto said conveyers, means preventing said insects from being brushed off of and over said conveyers and means adapted to pack the soil in advance of said brushes thereby preventing the same from being thrown upon the conveyers.

23. In an insect destroying machine the combination with a frame of oppositely moving conveyers thereon, guides directing plants along said frame, rotatable spiral brushes adapted to sweep the insects onto said conveyer and a central partition preventing the insects from being brushed off of the conveyers.

24. In an insect destroying machine the combination with a frame of adjustable sides, relatively adjustable conveyers on said frame, guides directing the plants along said sides, brushes adapted to brush the insects onto said conveyers, a partition for preventing the insects from being brushed off of or over the conveyers and means for simultaneously driving said brushes and conveyers.

In testimony whereof I have hereunto subscribed my name in the presence of two subscribing witnesses.

ELMER L. BRILLHART.

Witnesses:
C. W. HILLS,
W. W. WITHENBURY.